United States Patent [19]

Iwaki et al.

[11] 4,116,033
[45] Sep. 26, 1978

[54] METHOD AND APPARATUS FOR FORMING A WOUND CORE

[75] Inventors: Yoshiyuki Iwaki; Ryozo Kuroda, both of Himeji, Japan

[73] Assignee: Mitsubishi Denki Kabushiki Kaisha, Tokyo, Japan

[21] Appl. No.: 790,913

[22] Filed: Apr. 26, 1977

[30] Foreign Application Priority Data

Dec. 28, 1976 [JP] Japan .................. 51-159950

[51] Int. Cl.² ............ H02K 15/00; B21D 11/06
[52] U.S. Cl. .................................. 72/142; 29/596; 29/605; 29/609
[58] Field of Search ............ 29/596, 605, 609; 72/135, 142

[56] References Cited

U.S. PATENT DOCUMENTS

| 3,062,267 | 11/1962 | Hart et al. | 72/142 |
| 3,152,629 | 10/1964 | Rediger | 72/142 |
| 3,206,964 | 9/1965 | Hart et al. | 72/142 |
| 3,283,399 | 11/1966 | Hart et al. | 29/605 |
| 3,842,493 | 10/1974 | Ohuchi et al. | 29/596 |

Primary Examiner—E. M. Combs
Attorney, Agent, or Firm—Oblon, Fisher, Spivak, McClelland & Maier

[57] ABSTRACT

A wound core is formed by forming a core element having slots for inserting a wire and teeth with equal spaces on one side of a band steel sheet; and winding the core element by engaging pins and applying local stress at the part of the slots to the opposite side to deform the core element to sequentially bend it in a multi-angle structure and to wind it helically.

5 Claims, 20 Drawing Figures

METHOD AND APPARATUS FOR FORMING A WOUND CORE

BACKGROUND OF THE INVENTION

1. Field of the Invention

The present invention relates to a method of forming a wound core by helically winding a core element and an apparatus used for forming the same. The wound core is used, for example, as a stator of an AC generator for an automobile.

2. Description of the Prior Art

Heretofore, it has been known that a band steel sheet such as a silicon steel sheet which has slots in one side to form a core element can be wound in a helex by continuously engaging with the slots of the core element a plurality of equally spaced pins arranged in a circle and feeding the core element through an arcuate passage which has a width slightly smaller than the width of the core element, elongating the core element at the opposite side to the slots and compressing it in the axial direction.

However, the side of the core element opposite to the slots is elongated, making the core element to be thinner in the step of forming the sheet into an arcuate shape because the core element is compressed while it is passed through the arcuate passage. Accordingly, when the core element is wound a gap is formed at the outer peripheral part of the wound core and the wound core is deformed in the assembly whereby the wound wire is damaged.

Moreover, the side of the core element opposite to the slots is elongated making its thickness nonuniform. Accordingly, in winding the core element, the pitches of the slots are not uniform and the operation for adjusting the slot pitches with high accuracy has been very difficult.

SUMMARY OF THE INVENTION

A general object of the present invention is to overcome the above-mentioned disadvantage of the wound core.

The foregoing and other objects of the present invention have been attained by providing a method of forming a wound core by forming a core element having slots for inserting a wire and teeth with equal spaces in one side of a band steel sheet; and helically winding the core element by engaging pins and applying a local force at the part of the core element from the slots to the opposite side to deform the core element into a multiangle structure.

The apparatus of the present invention is provided to wind the core element by engaging the slots with a plurality of pins having a diameter being smaller than a longitudinal length of the slot and which are moved in circular path subject to a reciprocating motion.

BRIEF DESCRIPTION OF THE DRAWINGS

Various objects features and attendant advantages of the present invention will be more fully appreciated as the same becomes better understood from the following detailed description of the present invention when considered in connection with the accompanying drawings, wherein like reference numerals designate identical or corresponding parts throughout the several views.

DETAILED DESCRIPTION OF THE PREFERRED EMBODIMENTS

Figure 1:
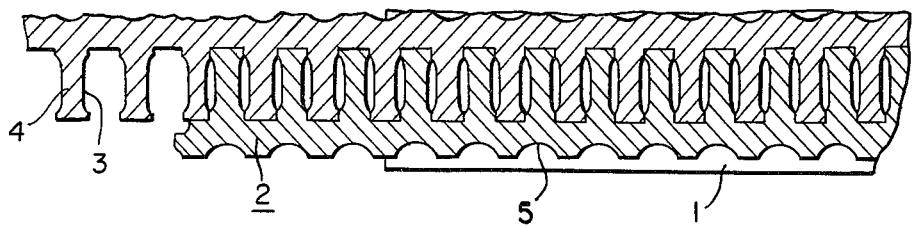
FIGS. 1 and 2 respectively represent enlarged views of a core element.

The present invention provides a novel method of forming a wound core and an apparatus for forming the wound core.

Referring to the drawings, the present invention will be illustrated.

Figure 2:
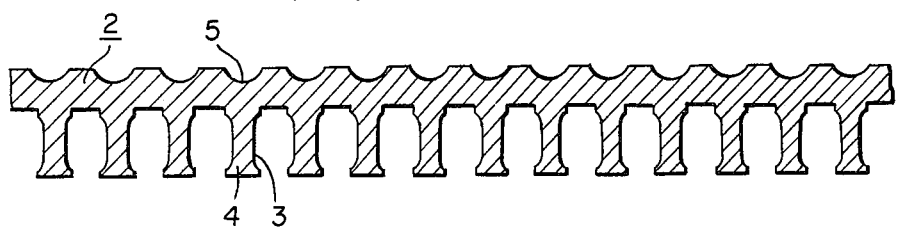
Figure 3:
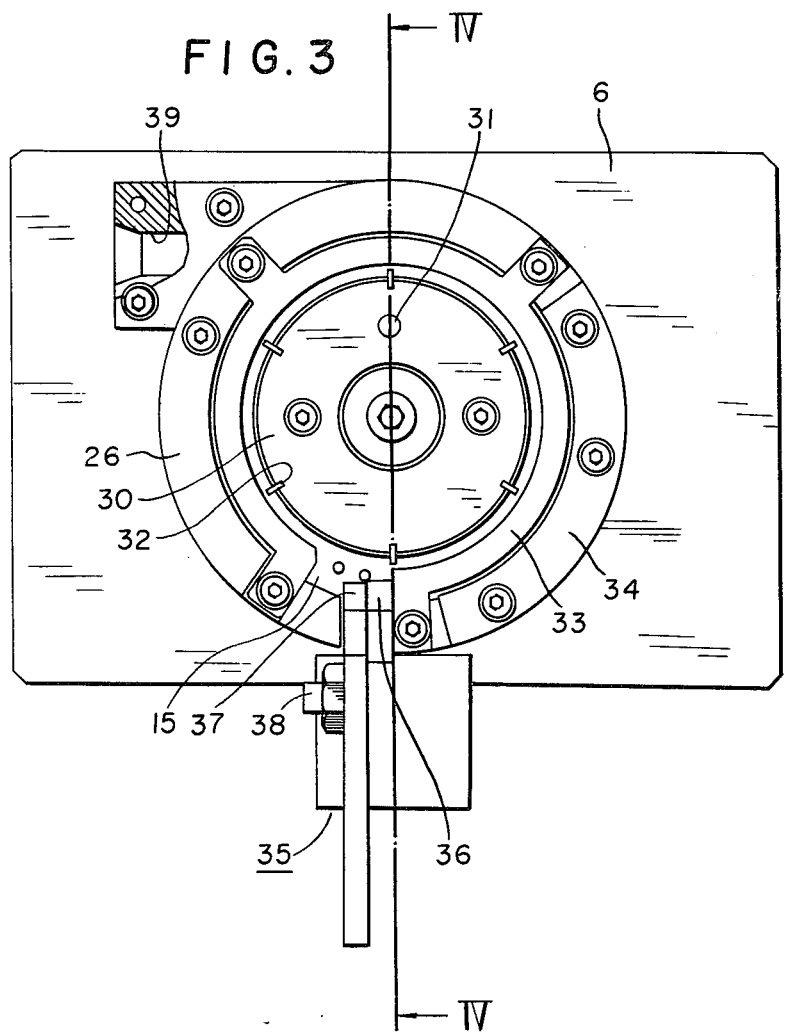
FIG. 3 is a plan view of one embodiment of the present invention.
Figure 4:
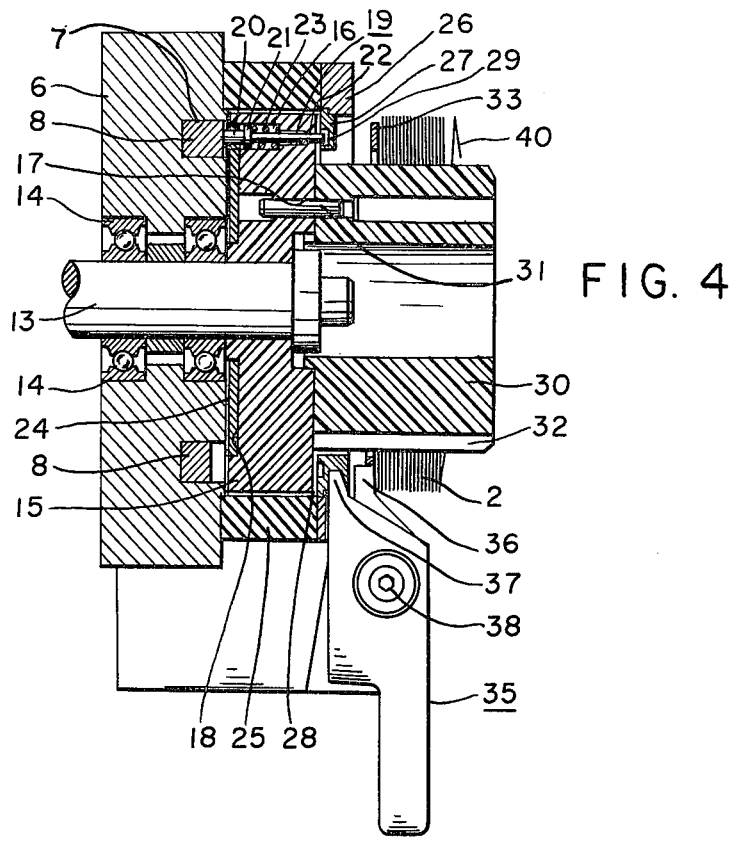
FIG. 4 is a sectional view taken along the line IV—IV in FIG. 3.

In FIGS. 1 and 2, the reference 1 designates a band steel sheet such as a silicon steel sheet; 2 designates a pair of the core elements which are formed by stamping out the silicon steel sheet 1 by a press etc. the core element has U-shaped slots 3 which are arranged with equal spaces (the slot is different from the notch in the rear side), teeth 4 formed by the slots 3, and semicircular notches 5 which are formed on the opposite side to the teeth 4.

Figure 11:
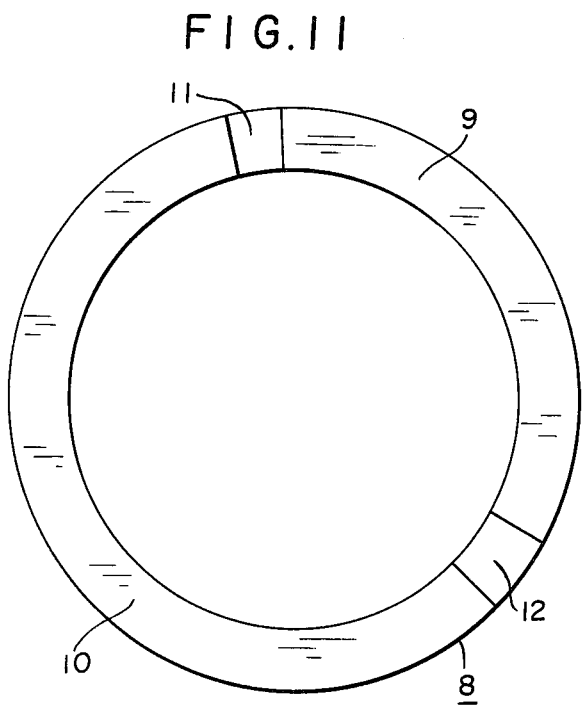
FIG. 11 is a plan view of a cam.

The apparatus for helically winding the core element 2, will be illustrated referring to FIGS. 3 to 11, wherein the reference 6 designates a first table which has a concave annulus 7; 8 designates an annular cam which is fitted in the concave annulus 7 of the table 6, and which includes a higher part 9 and a lower part 10 and a first taper part 11 and a second taper part 12 in FIG. 11. The ratio of the higher part 9 to the lower part 10 can be selected as desired. The reference 13 designates a rotary shaft held through bearings 14 on the first table 6; 15 designates a rotary means fitted at the end of the rotary shaft 13. Holes 16 including a first hole, a second hole having a smaller diameter and a third hole having a yet smaller diameter which is slightly larger than each end of the following drive pins, are formed, for example, at 36 positions in the case of 12 poles. Several holes 17 are formed from the holes 16 to the axis side.

Annular hole 18 including the openings of the holes 16, 17 is formed. The reference 19 designates drive pins which are respectively fitted to the holes 16 and each drive pin includes a head 20 contacted with the cam 8 and a flange 21 and a shank 22 being engaged with the slot 3 of the core element 2. The grips 22 are arranged with equal distances (S) which are the same as the distances between teeth 4. The reference 23 designates a spring pressing the pin 19 against the cam 8, which is disposed between the pin 19, the flange 21 and the end of the first hole of the hole 16; 24 designates a doughnut type disc fitted in the hole 18 of the rotary means 15. In the disc, the holes for passing the heads 20 of the pins 19 are formed whereby the movement of the pins 19 to the cam 8 is regulated. The reference 25 designates a second cylindrical table fixed to face the rotary means 15 of the first table 6 with a fine gap in the radical direction. Only the end of the inner peripheral surface in the axial direction is slidably contacted with the rotary means 15. The reference 26 designates a supporting plate fixed on the end of the side of the second table 25; 27 designates a first guide plate forming an annular passage 28 for core element 2 and facing the rotary means 15 fixed on the inner side of the supporting plate 26 with a predetermined gap in the axial direction. A concave annulus 29 for inserting the end of the shank 22 of the pin 19 is formed in the first guide plate. The reference 30 designates a mandrel which is fixed on the rotary means 15 with a nock pin 31 put into the hole 17. For example, keys 32 are fitted in the axial direction at 6 positions with equal spaces on the outer peripheral part of the mandrel. The reference 33 designates a second guide plate which is fixed on the supporting plate 26 by screwing to place the central side in the axial direction of the mandrel 30; 34 designates a pressing plate fixed on the supporting plate 26 by screwing at the position between the first and second guide plates 27, 33; 35 designates a cutter for cutting the core element fed under pressing by the pressing plate 34 and the cutter includes a fixed cutting edge 36, a movable cutting edge 37 and a bolt 38 for holding the movable cutting edge 37 to be movable relative to the fixed cutting edge 36. The reference 39 designates a guide inlet for feeding the core element 2 into the annular path 28.

Figure 13:
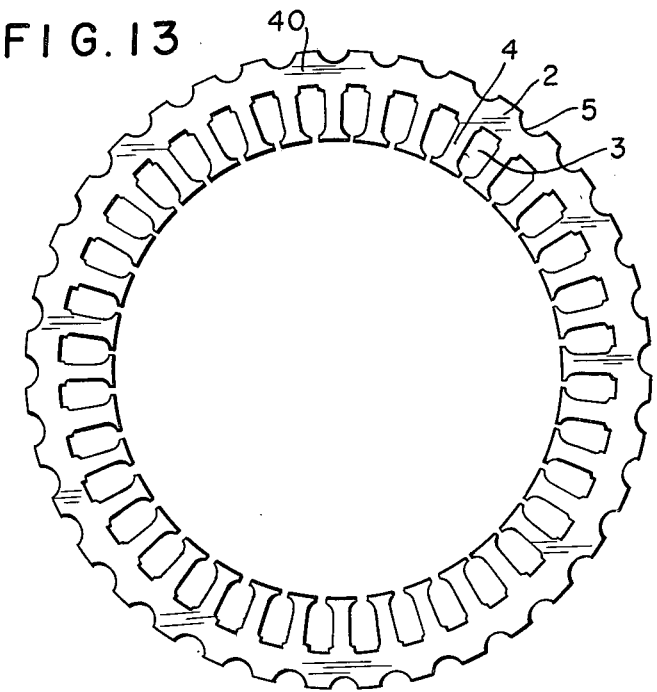
FIG. 13 is a plan view of the wound core.
Figure 12:
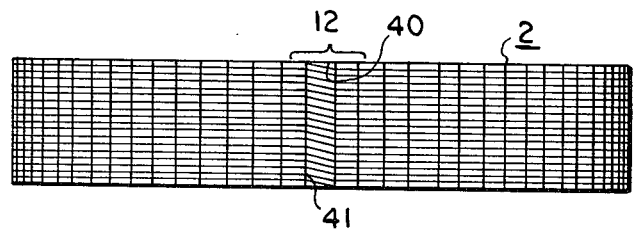
FIG. 12 is a side view of the wound core.

FIGS. 12 and 13 show the wound core prepared by helically winding the core element 2 to build it up while compressing it.

In FIGS. 12 and 13, the reference 40 designate a first part of the wound core and 41 designates the last part of the wound core and 42 designates a compressed deformed part.

The operation for helically winding the core element 2 will be illustrated. Thirty six pins 19 which are sequentially engaged in the slots 3 of the core element 2, are rotated while undergoing a reciprocating motion. In the operation for winding the core element 2 by the pins 19, the success of the practical operation is dependent upon whether the shanks 22 of the pins 19 can be engaged in the slots 3 of the core element 2 to produce the required normal motion or not.

Figure 14:
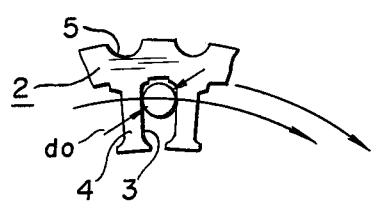
FIGS. 14 and 15 are schematic views for deciding a diameter of a grip (22) of a pin (19)
Figure 15:
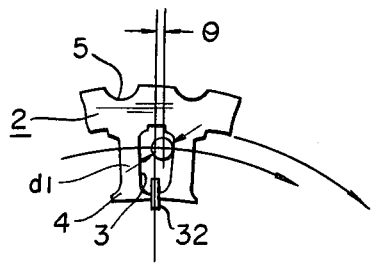

The important factor is the size of the shanks 22 of the thirty six pins 19. The size of the shanks 22 is decided as follows with reference to FIGS. 14 and 15.

The diameter of the inscribed circle in the slot 3 of the core element 2 is given as $d_0$ and the diameter of the shank 22 is given as $d_1$ which is about 70% of the inscribed circle $d_0$.

Figure 16:
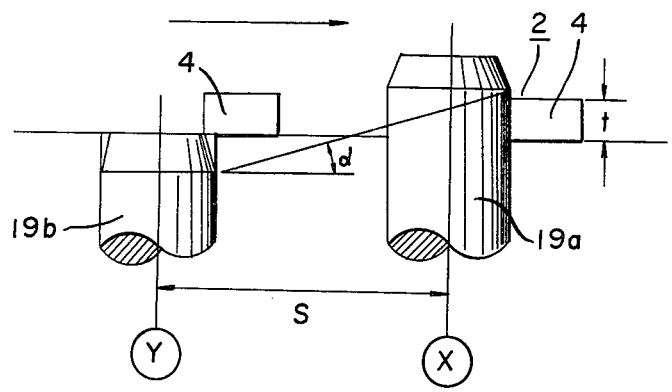
FIGS. 16, 17 and 18 respectively schematic view showing the condition of the reciprocating motion under rotating the pin.
Figure 17:
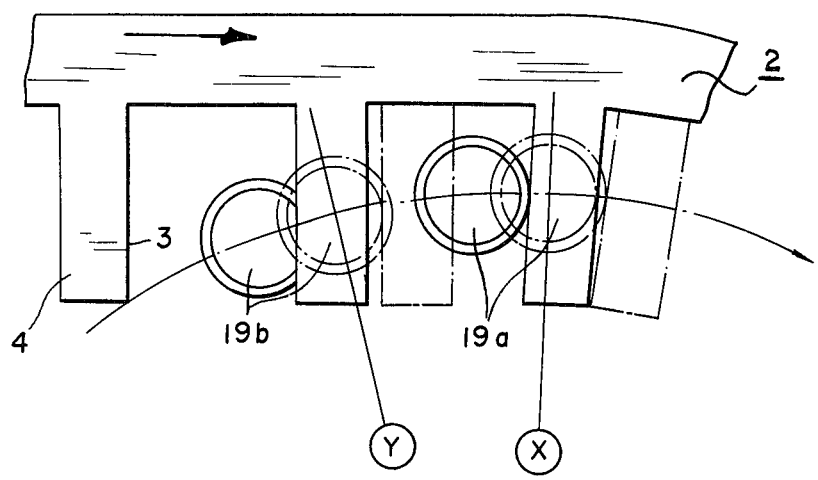

As shown in FIGS. 16 and 17, the tip of the shank 22 is beveled to have a trapezoidal so as to contact the pin 19b with the next slot 3 of the core element 2 at the position Y initiating the engagement of a pin 19a which is in front of the pin 19b at the position X where the core element 2 is bent by the pin 19. (The condition will be described below).

Incidentally, when the pin 19 is engaged with the slot 3 before completing the bending of the core element 2, (the condition in FIG. 14), it is necessary to give the same curvature from the initiation of the insertion of the core element 2 in the normal condition, and it is necessary to decide the position with high accuracy. Pitch error in punching out the steel sheet 1 and fluctuation in the thickness of the steel sheet are not allowed.

The practical curvature of the circle is varied by the fluctuation of the pitches and the thickness of the steel sheet, whereby the shanks 22 of the pins 19 are contacted with the teeth 4 and the engagement can not be attained and the normal operation can not be attained.

In accordance with the embodiment of the present invention, the core element 2 can be linearly fed on the tangential line of the circle on which the pins 19 are arranged and the above-mentioned trouble is not caused. Thus, the size of the shanks 22 of the pins 19 is $d_1$. Accordingly, when the shank 22 is completely engaged in the slot 3 of the core element 2, (FIG. 15), the center of the key 32 engaged in the opening of the slot 3 is displaced degrees from the center of the shank 22. As the result, the core element 2 is bent against the restoring force which is the reaction force caused by the elastic deformation, and the expansion of the wound core can be prevented.

The locus of the center of the pin 19 can be selected as desired by providing a small diameter $d_1$ of the shank 22. Thus, when the locus of the circle is too small, the bending of the teeth 4 of the core element 2 is too large, whereby the pin 19 is shifted in the radial direction and the core element 2 cannot be smoothly wound. Accordingly, it has been confirmed that the locus of the shank 22 of the pin 19 is preferably the same as the locus of the center of the inscribed circle $d_0$.

Thus, when the rotary means 15 is rotated and the mandrel 30 is simultaneously rotated, thirty six pins 19 arranged on the rotary means 15 are rotated sequentially while undergoing a reciprocal motion.

Referring to FIGS. 10, 11, 16 to 18, the operation will be illustrated.

Figure 18:
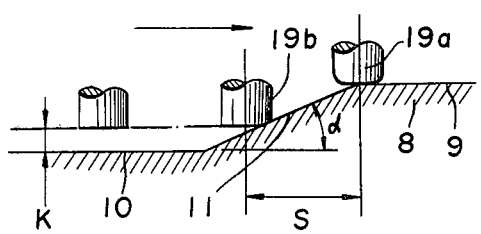

The pin 19a facing the bottom of the cam 8 with a predetermined gap K is moved by the rotation of the rotary means 15 whereby the head 20 of the pin 19a is shifted from the bottom 10 to approach the first taper part 11. As shown in FIG. 18, the head 20 of the pin 19a is contacted to the first taper part 11 and it is further shifted the axial direction while sliding on the first taper part 11 (the upper direction in FIG. 18) against the spring force of the spring 23. The shank 22 begins to project from the hole 16 of the rotary means 15. The head 20 of the pin ascends to the higher part 9 of the cam 8. The shank 22 is completely projects from the hole 16 near the tangential line in the longitudinal direction of the core element 2 to the locus circle of the pin 19, whereby the shank 22 is completely engaged in the slot 3 of the core element 2. At the time when the shank 22 of the pin 19a is completely engaged in the slot 3 of the core element 2, the pin 19b which is a distance (S) behind the pin 19a, is placed so as to slightly contact to the next slot 3. When the core element 2 is wound by the pin 19a to forwardly move to the position (X) shown by the one dotted chain line in FIG. 17, the leveled tip of the shank 22 of the pin 19b is rotated while moving to the position (Y) and contacted with the rear end of the teeth 4 corresponding to the slots 3 (shown in FIG. 16).

The spaces between the pins including the pins 19a, 19b are set to be equal to the distances (S) between the teeth 4 for bending the core element 2 in circle. Thus, the beveled part of the tip of the shank 22 of the pin 19 provides an important function. Even though the spaces between the teeth 4 are varied, the pin 19 can be easily engaged in the slot 3 through the beveled tip of the shank 22 of the pin 19. The core element 2 is continuously bent about the tangential line whereby the pitches of the slots 3 are not uniform near the tangential line. The pins 19 can be easily engaged in the non-uniform slots 3. Thus, sixteen pins 19 are contacted with the higher part 9 of the cam 8 and the pins 19 sequentially descend through the second taper 12 to be put into the holes 16 of the rotary means 15 and the operation is repeated.

The slant angle of the first taper part 11 is set at an angle $\alpha$ so that the pin 19 can easily ascend and the next pin 19b is contacted with the first taper part 11 to initiate the ascending when the pin 19a ascends to the higher part 9.

The core element 2 is forcibly fed from the guide inlet 33 through the taper part to slide the outer surface of the core element on the inner wall of the annular path 28, whereby the shank 22 of the pin 19 is put into the front slot 3 of the core element 2 in the forward side to engage it and the core element 2 is wound on the mandrel 30 by the rotation of the rotary means 15. At the same time, the opening of the slot 3 of the core element 2 is engaged in the key 32 of the mandrel 30. In this position, the core element 2 is pulled in the direction opposite to a rotating direction of the pin 19 by the tension slightly smaller than the rotational force on the pin. Accordingly, when the core element 2 is wound by the pin 19 on the mandrel 30 in the rotating direction of a pin 19 for the predetermined distance the shank 22 of the next pin 19 is put into the slot to engage it to the next slot 3 of the core element 2 in the forward direction and the core element 2 is further wound. Thus, the end of the core element 2 is contacted with the inner wall of the annular path 28 and the core element is bent by the force in the radial direction, and the plastic deformation of the core element causes it to form a part of a multi-angled structure which is substantially a circle.

Figure 19:
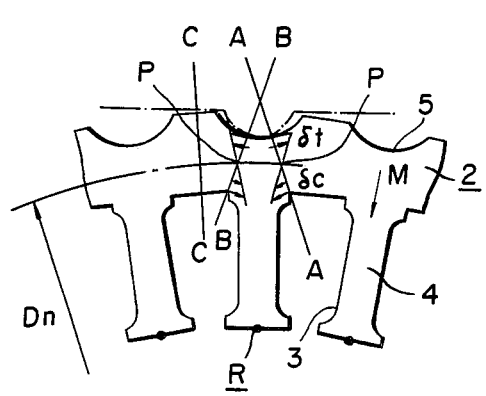
FIG. 19 is a schematic view showing the condition for bending the core element.
Figure 20:
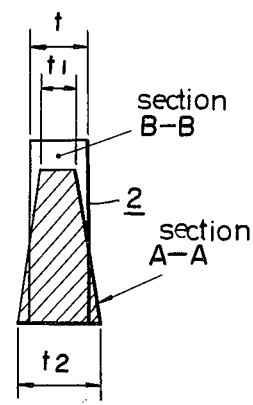
FIG. 20 is a sectional view of the core element for showing the thickness of the bent wound core element.

Thus, the shank 22 of the pins 19 are sequentially engaged in the slots of the core elements 2 whereby the core element 2 is continuously wound. Referring to FIGS. 19 and 20, the operation for bending the core element 2 in a multi-angle structure, will be illustrated.

The front end of the core element 2 is pulled by the tension $F_1$ caused by the torque of the pin 19 and the rear part of the core element 2 is pulled in the opposite direction (opposite to $F_1$) by the tension $F_2$ ($F_2 < F_1$) and the core element 2 is wound by the pins 19. The bending stress M is applied to the core element in the radial direction.

Accordingly, the local stress is applied to the A—A line from the slot 3 of the core element 2 to the notch 5. The stress $\delta_t$ is applied to the outer peripheral part and the stress $\delta_c$ is applied to the inner peripheral part as the boundary point P. As shown by the shading (A—A sectional view of FIG. 20), the plastic deformation of the core element is formed by the elongation of the outer peripheral part to vary the thickenss $t$ of the core element to the thinner thickness $t_1$ and by contraction of the inner peripheral part to vary the thickness to the thicker thickness $t_2$.

Then, the local stress is also applied to the part the of B—B line from the rear of slot 3 to the notch 5 whereby the core element is bent and the plastic deformation is also caused. On the other hand, the part of C—C line of the the core element 2 is not substantially affected by the bending stress M and only a slight elastic deformation is formed and the thickness is not substantially varied (C—C sectional view of FIG. 20). The bending stress M is continuously applied to the core element 2 whereby the plastic deformation of the core element 2 is continuously caused to bend it and the core element is wound in a multi-angle structure which is helical.

Figure 5:
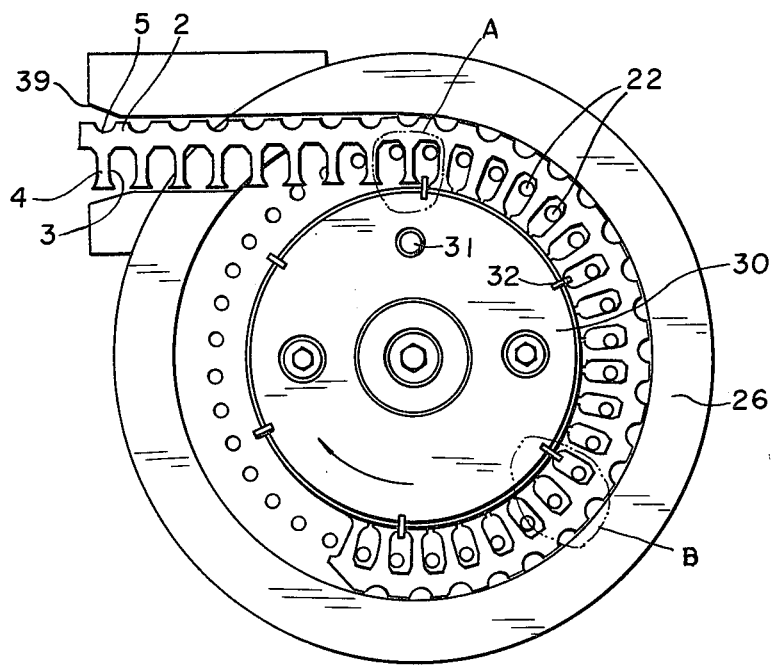
FIG. 5 is a plan view showing the condition of winding the core element.
Figure 6:
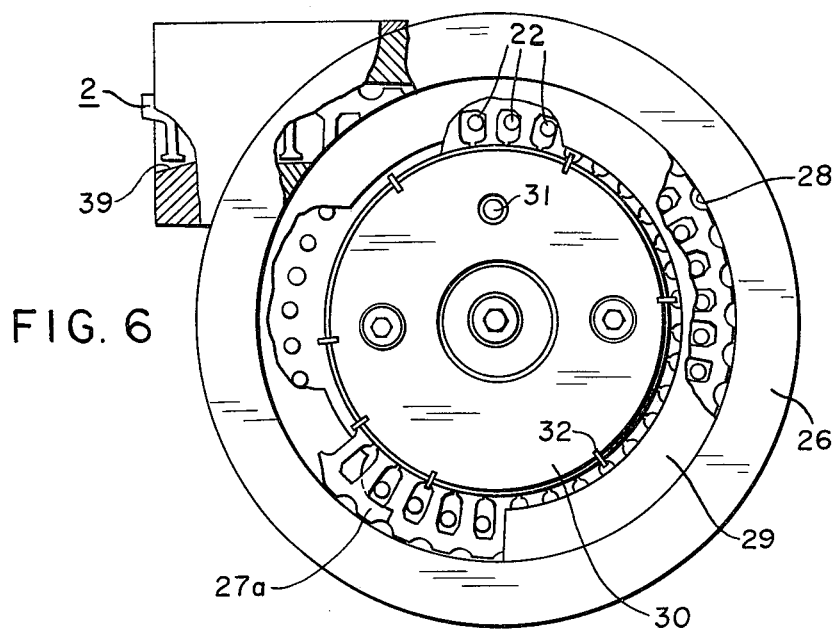
FIG. 6 is a plan view showing the condition that the core element is wound.
Figure 7:
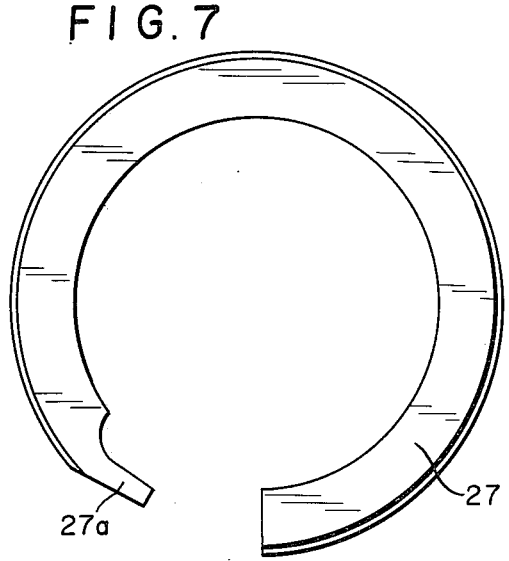
FIG. 7 is a plan view of a first guide plate.
Figure 8:
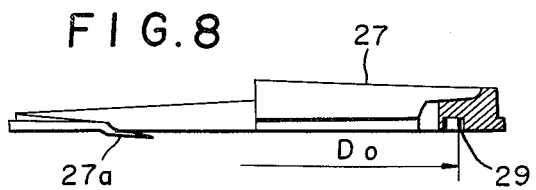
FIG. 8 is a side view of the first guide plate.
Figure 9:
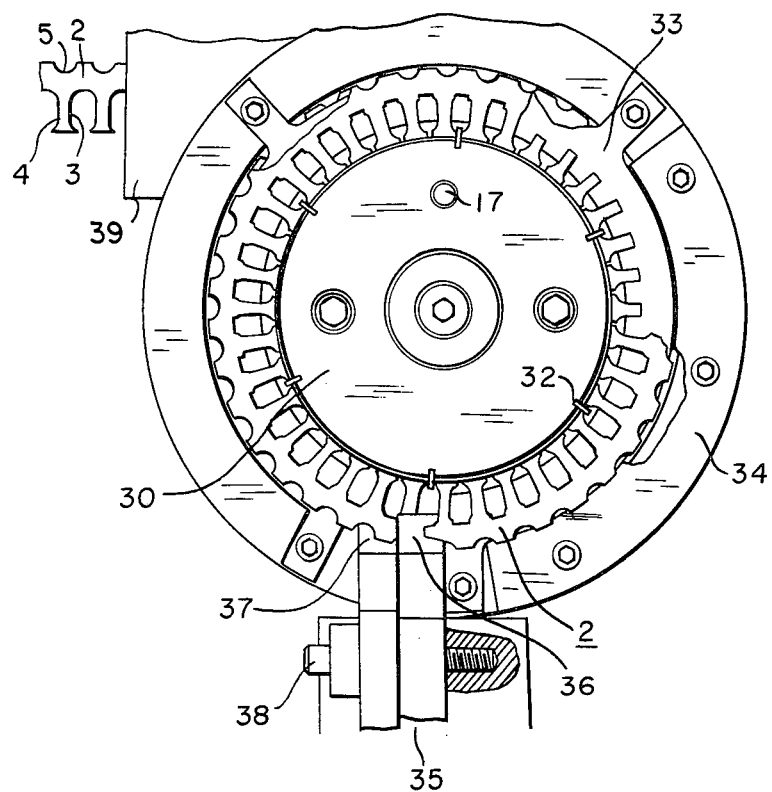
FIG. 9 is a plan view showing the condition of cutting the wound core element by a cutter.
Figure 10:
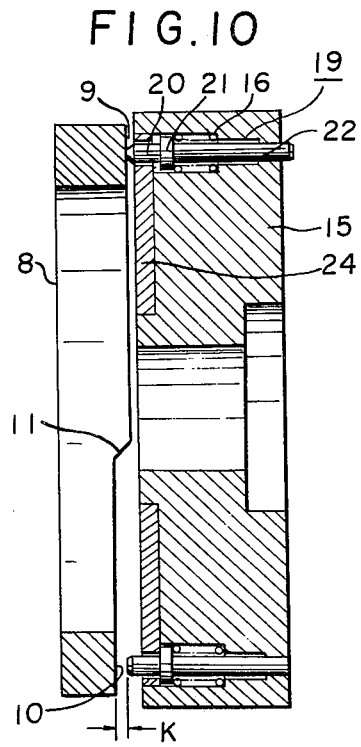
FIG. 10 is a sectional view of a cam mechanism for reciprocating motion.

In FIG. 5, the bending stress M for the plastic deformation of the core element at the position (A) is equal to the resultant force of stress for winding by thirteen of the pins 19 (tension $F_1$) which are engaged in the slots 3 of the core element 2. The large bending stress M is formed by the combination of small stresses.

The stress applied to the ends R of the teeth 4 by winding the core element 2 while contacting the teeth 4 with the peripheral part of the mandrel 30 is shared by the teeth 4 whereby the damage of the teeth 4 by the deformation is not caused. Moreover, in the range for bending the core element 2 (the range from the position (A) to the position (B) in FIG. 5), the tendency is for recovering the core element 2 by the elasticity in the part of the C—C line along the radial direction. However, the core element 2 is wound so as to press the ends of the teeth 4 of the core element 2 to the outer peripheral part of the mandrel 30 at a displacement angle between the mandrel 30 and the pins and the key 32 and the shanks 22 of the pins 19. Accordingly the other end of the core element 2 is not contacted with the inner wall of the annular path thereby preventing the wear of the inner wall or the deformation of the other end of the core element 2.

Thus, the core element 2 is sequentially bent in a multi-angle structure to be wound by the torque of the pin 19 under the rotation of the rotary element 15. The forward end of the core element 2 is forwardly moved in the axial direction by the end 27a of the first guide plate 27. The core element 2 is further wound and bent by the rotation of the rotary element 15. The core element 2 is guided in multi-angle structure by the pressing plate 34 and the second guide plate 33 to be wound on the peripheral part of the mandrel 30. When a suitable length of the core element 2 is wound, the rotation of the mandrel 30 is stopped and the core element 2 guided by the pressing plate 34 is disposed between the fixed cutting edge 36 of the cutter 35 and the movable cutting edge 37 of the cutter to cut the core element 2 by moving the movable cutting edge 37 in the arrow line direction.

The core element 2 wound in the multi-angle structure for a suitable length, is transferred to the another lace and it is compressed for stacking by a compressing apparatus, (the condition shown in FIGS. 12 and 13).

In order to complete the wound core, the core element 2 is welded in the built-up direction with suitable spaces at the positions of the notches 5 on the peripheral part of the core element. The operation is repeated to continuously prepare the wound cores.

In the embodiment, the disclosed notches 5 are formed in the opposite side of the core element 2 corresponding to the teeth 4, whereby the local stress can be easily applied by the pins 19 to the parts of the A—A line and the B—B line from both slots 3 in both sides of the tooth 4 to the notch 5 and the core element is easily bent when the core element 2 is wound by the pins 19. Moreover, when the wound core is assembled on the generator, the notches 5 can be used as the paths for the bolts and it is unnecessary to form holes in the wound core for the bolts.

In the above-mentioned embodiment, the notches 5 are formed in the other side of the core element 2. However, the notches 5 are not always necessary. The core element 2 can be easily bent without notches in the apparatus. In the latter case the, thickness of the peripheral part of the core element 2 becomes slightly thinner than that of the former embodiment. The problem is not so serious. The same results can be attained by forming two notches corresponding to two slots 3. Obviously, numerous modifications and variations of the present invention are possible in light of the above teachings. It is therefore to be understood that within the scope of the appended claims, the invention may be practiced otherwise than as specifically described herein.

The diameter of the pin is set to be smaller than the size of the slot in the longitudinal direction and a plurality of the pins can be sequentially engaged to the slots in the reciprocating motion. The effect is remarkable when the pitches of the slots of the core element are not uniform.

What is claimed is:

1. A method for helically winding a core element comprising the steps of:
    providing a strip having a solid portion with a plurality of teeth extending therefrom with slots between the teeth;
    providing a pin having a shank of diameter smaller than the width of the slots between the teeth included in the strip;
    reciprocating the pin along its axis;
    engaging the shank of the pin inside a slot formed by a pair of teeth included in the strip;
    rotating the pin about a fixed point;
    providing a mandrel having a key;
    engaging, simultaneously with the engagement of said pin shank in said slot, the key of the mandrel between forward edges of said pair of teeth included in the strip to position the center of said key at a predetermined angle relative to the center of said pin shank; and
    rotating the mandrel about the fixed point simultaneously with the step of rotating the pin to impart local stresses in the solid portion of the strip as the strip is helically wound about the fixed point.

2. The method recited in claim 1 wherein the strip providing step includes;
    providing a strip having a solid portion with a plurality of teeth extending from one side of the solid portion with slots between the teeth, and a plurality of notches in the other side of the solid portion, the depth of the notches being less than the depth of the slots.

3. The method recited in claim 1, wherein the pin providing step includes:
    providing a pin having a shank and a head and beveled corners.

4. In an appartus for helically winding a core element consisting of a strip having a solid portion with a plurality of teeth extending therefrom with slots between the teeth, the combination of:
    a rotatable member;
    a plurality of annularly displaced pins reciprocably mounted in said rotatable member, each pin adapted to engage a slot in the strip;
    a rotatable mandrel having at least one key adapted to engage simultaneously with the engagement of said pins in said slots, forward edges of a pair of teeth which bound said slot so that the center of the key is displaced by a predetermined angle from the center of a pin engaged in a slot between the pair of teeth;
    means for rotating the rotatable member and the rotatable mandrel simultaneously to impart a stress along the solid portion of the strip as the strip is helically wound.

5. The apparatus recited in claim 4, wherein each of the pins has a head with beveled corners.

* * * * *